US006626150B2

(12) United States Patent
Palma

(10) Patent No.: US 6,626,150 B2
(45) Date of Patent: Sep. 30, 2003

(54) ELECTRONICALLY CONTROLLED CONTINUOUS FUEL PRESSURE REGULATOR

(75) Inventor: Rodolfo Palma, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 127 days.

(21) Appl. No.: 09/826,462

(22) Filed: Apr. 4, 2001

(65) Prior Publication Data

US 2002/0144673 A1 Oct. 10, 2002

(51) Int. Cl.[7] .......................... F02M 31/12; F16K 15/00
(52) U.S. Cl. ................ 123/458; 251/129.1; 251/129.21
(58) Field of Search ................................ 123/457, 458, 123/510, 511, 514; 251/129.09, 129.1, 129.15, 129.16, 129.21, 129.22

(56) References Cited

U.S. PATENT DOCUMENTS 6,164,322 A * 12/2000 Najmolhoda et al. ....... 137/540
6,378,500 B1 * 4/2002 Schreckenberger ......... 123/457

* cited by examiner

*Primary Examiner*—Tony M. Argenbright
*Assistant Examiner*—Arnold Castro
(74) *Attorney, Agent, or Firm*—Brinks Hofer Gilson & Lione

(57) ABSTRACT

A fuel pressure regulator is provided for producing more than one fuel pressure. The fuel pressure regulator includes a pressure plate that restricts fuel flow between an input line and an output line. A spring is provided for applying a force to the pressure plate. A coil and armature are also provided. The coil attracts the armature to a casing or head pole, thus applying more force to the pressure plate.

15 Claims, 7 Drawing Sheets

52
58
58
56
56
54
78
78
90
74
70
64
66
60
82
72
80
92
94
94
68
62
62
68

ELECTRONICALLY CONTROLLED CONTINUOUS FUEL PRESSURE REGULATOR

BACKGROUND

The present invention relates generally to automotive fuel systems, and more particularly, to a fuel pressure regulator.

In automotive vehicles, the fuel supplied to the engine is pressurized before being fed to the engine. Typically, automotive fuel is stored unpressurized in a fuel tank. Through a series of pumps, valves and fuel lines, the fuel system then pressurizes the fuel to a final pressure before introducing the fuel to the engine. The final pressure of the fuel, however, is closely controlled to ensure proper performance of the engine.

Commonly, automotive fuel systems use a conventional fuel pressure regulator in at least one stage of fuel pressurization. The fuel pressure regulator may be located within the fuel tank of the vehicle, although the regulator may be located elsewhere in the fuel system. Typically, high pressure fuel is supplied to the fuel pressure regulator from a pump powered by a DC motor. The pressure level of the fuel supplied by the pump usually fluctuates. One reason for these pressure fluctuations is that the voltage supplied to the DC motor varies depending on the loads applied to the vehicle's electrical system and temperature and pressure changes in the fuel delivery system. The fuel pressure regulator removes these pressure fluctuations by introducing a pressure drop and supplying an output fuel line with lower pressure fuel with a generally constant pressure level.

Conventional fuel pressure regulators are usually preset by the manufacturer to provide a single pressure level at the output line. This is often achieved by calibrating a bias valve, such as a spring valve, during assembly of the fuel system. Although these systems are relatively inexpensive and simple to assemble, they are unable to provide variable pressure levels at the output line. As the demand for fuel efficiency and higher performance has increased, a need now exists for fuel systems that can provide variable fuel pressure depending on the operating conditions of the vehicle. Moreover, it is desirable to provide electronic control of the fuel system so the vehicle's central processing unit can automatically adjust the fuel pressure.

One alternative fuel system involves providing a brushless DC motor with speed control circuitry to power the fuel pump. A pressure sensor is also provided to monitor the pressure level of the fuel exiting the fuel pump. Thus, by monitoring the pressure level with the pressure sensor, the vehicle's central processing unit can adjust the speed of the motor to achieve the desired fuel pressure. The problem with this alternative is the high cost of the system compared to conventional fuel systems. For example, the brushless DC motor with speed control circuitry is more expensive than the standard DC motor used in conventional systems. An expensive pressure sensor is also required which is unnecessary in conventional systems. In addition, this alternative fuel system is more complicated and difficult to assemble than conventional fuel systems.

SUMMARY

The present invention is defined by the following claims, and nothing in this section should be taken as a limitation on those claims. By way of introduction, the embodiments described below include an electronically controlled continuous, fuel pressure regulator that produces more than one fuel pressure. The fuel pressure regulator includes an input line, an output line and a pressure plate that restricts fuel from passing from the input line to the output line. A spring is provided for resisting movement of the pressure plate. A coil, armature and casing or head pole are also provided for further resisting movement of the pressure plate. When electric current is supplied to the coil, a magnetic force attracts the armature toward the casing- or head pole.

Different embodiments of the fuel pressure regulator are provided. One embodiment includes a connecting tube. In this embodiment, the spring is compressed by the connecting tube when electric current is supplied to the coil. In other embodiments, a shaft is connected to the pressure plate and to the armature. In these embodiments, the armature resists movement of the pressure plate when electric current is supplied to the coil.

BRIEF DESCRIPTION OF THE DRAWINGS

The invention, including its construction and method of operation, is illustrated more or less diagrammatically in the drawings, in which.

DESCRIPTION

Figure 1:
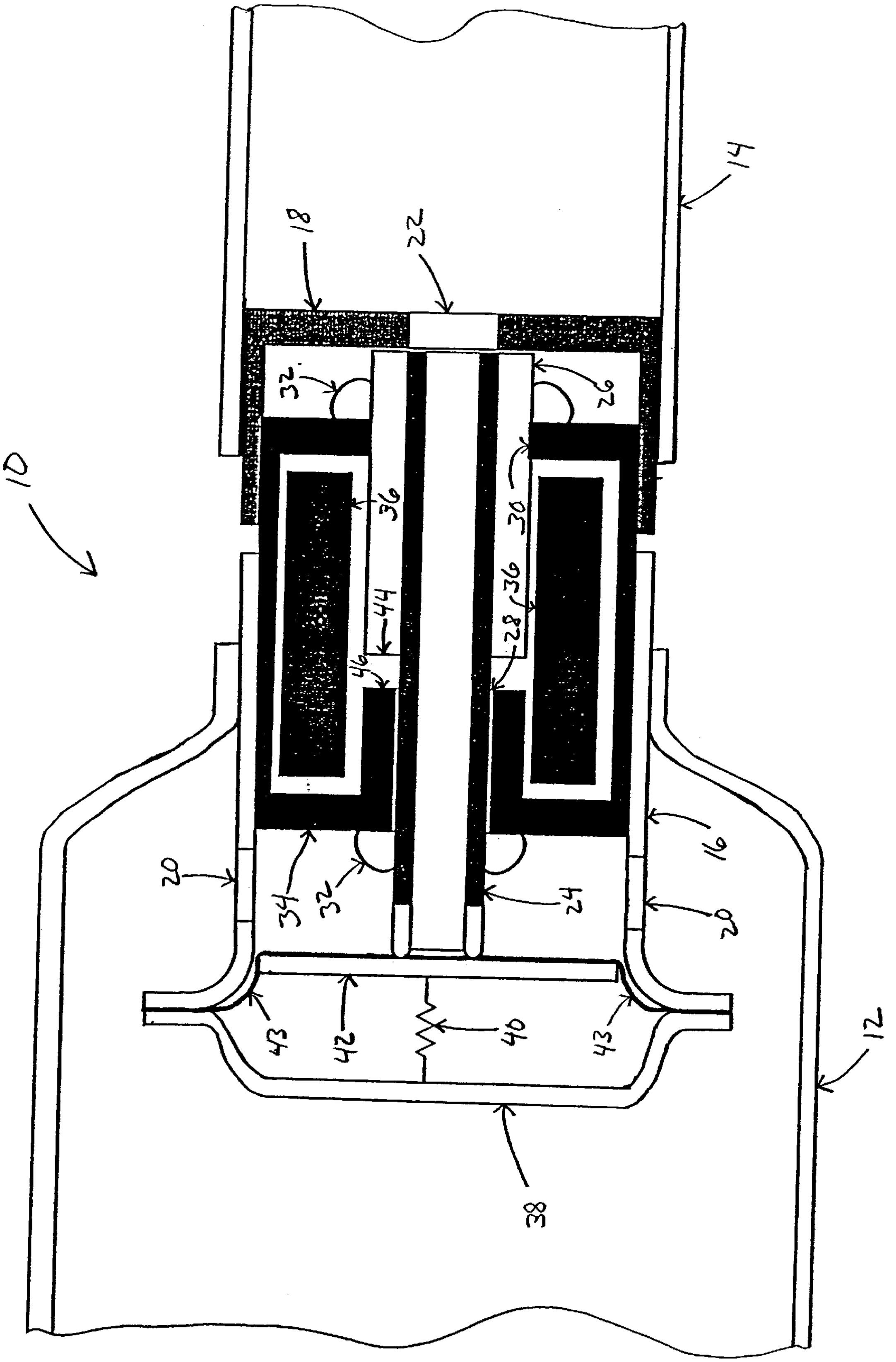
FIG. 1 is a cross-section view of a first embodiment of a fuel pressure regulator.
Figure 2:
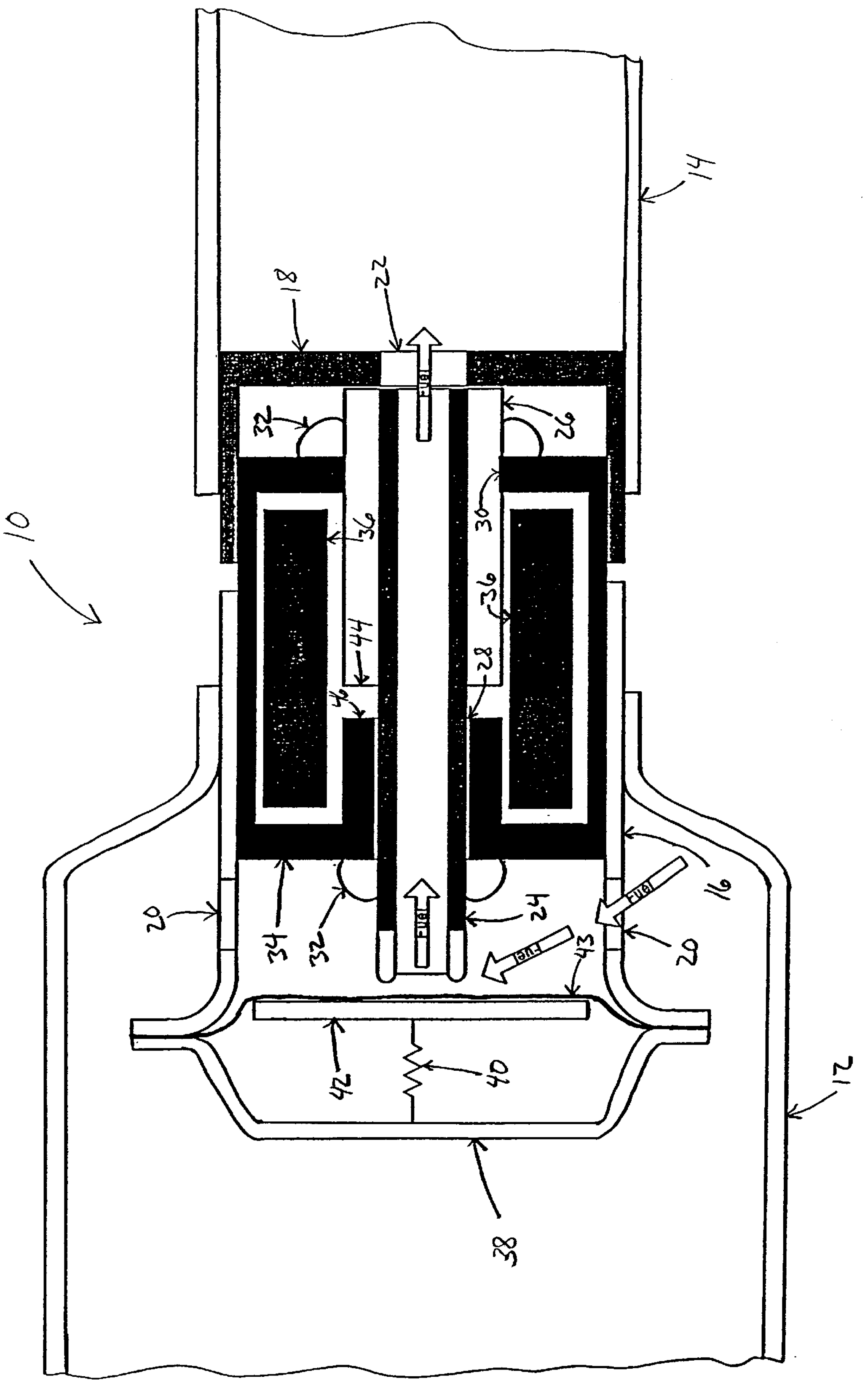
FIG. 2 is a cross-section view of the first embodiment of the fuel pressure regulator, showing fuel flow through the fuel pressure regulator.

Referring now to the drawings, several embodiments of a fuel pressure regulator are provided that can produce more than one fuel pressure. The first embodiment is shown in FIGS. 1 and 2. Like conventional fuel systems, the fuel pressure regulator 10 is installed within the fuel tank (not shown) of an automotive vehicle. The fuel pressure regulator 10 may also be installed elsewhere in the fuel system as desired. A fuel pump (not shown) supplies high pressure fuel to the fuel pressure regulator 10 through an input line 12. As will be explained in detail below, the fuel pressure regulator 10 then passes the fuel from the input line 12 to the output line 14.

The regulator 10 reduces the pressure of the fuel from the input line 12 and provides a controlled, lower pressure fuel at the output line 14. The first embodiment generally produces one of two possible fuel pressures at the output line 14. Accordingly, when no electric current is supplied to a coil 36, a spring 40 generates a force that results in low fuel pressure in the output line 14. However, when electric current is supplied to the coil 36, the spring 40 and magnetic force generate a larger force that results in high fuel pressure in the output line 14.

The fuel pressure regulator 10 includes a front housing 16 and a rear housing 18. The front housing 16 is sealed and fixedly attached to the input line 12, while the rear housing 18 is sealed and fixedly attached to the output line 14. The rear housing 18 may also be attached to the output line 14 in other ways that are well known to those in the art. Along the circumference of the front housing 16 is a series of holes 20 that allow fuel from the input line to flow into the regulator 10. The rear surface of the rear housing 18 includes a single hole 22 that allows fuel to pass out of the regulator 10 and into the output line 14. As shown in FIG. 2, the fuel flows through a connecting tube 24 from the input line 12 to the output line 14.

The connecting tube 24 is fixedly attached to an armature 26, and the connecting tube 24 and armature assembly 26 freely slide within first 28 and second 30 guide diameters. The connecting tube 24 and armature assembly 26 is also sealed to the casing 34 with bellow seals 32 to prevent fuel leakage through the first 28 and second 30 guide diameters. A variety of seals may be used, such as bellows seals 32 that are affixed at one end to the connecting tube 24 or armature 26 and at the other end to the casing 34.

The casing 34 is sealed and fixedly attached to both the front housing 16 and the rear housing 18. The electrical coil 36 is installed within the casing 34 and around the tube 24 and can be supplied with electric current through electrical terminals (not shown).

Fixedly attached to the front side of the front housing 16 is a support plate 38. A spring 40 is attached at one end to the rear surface of the support plate 38. At the other end, the spring 40 is attached to a moveable pressure plate 42. A bellow 43, or membrane, seals one side of the pressure plate 42 from the input line 12, thereby creating a cavity behind the pressure plate 42.

In the low pressure mode, little or no electric current is supplied to the coil 36. Therefore, in the low pressure state, the connecting tube 24 and armature 26 assembly moves rearward until the rear surface of the armature 26 abuts against the rear housing 18. Thus, the spring 40 forces the pressure plate 42 against the front end of the connecting tube 24.

High pressure fuel flows from the fuel pump to the regulator 10 through the input line 12. The high pressure fuel enters the regulator 10 through the radial holes 20 in the front housing 16. The high pressure fuel then applies a force to the pressure plate 42 that is proportional to the surface area of the pressure plate 42 and to the pressure level of the fuel. As shown in FIG. 2, the force applied by the high pressure fuel causes the pressure plate 42 to move forward (i.e., toward the left in FIGS. 1 and 2) and away from the connecting tube 24, thereby compressing the spring 40. The fuel then passes into and through the connecting tube 24 and flows out of the regulator 10 through the axial hole 22 in the rear housing 18. The fuel then flows to the rest of the fuel system through the output line 14.

Accordingly, the regulator 10 causes a drop in the fuel pressure from the input line 12 to the output line 14. The fuel pressure in the output line 14 is also generally constant even if the level of fluid pressure in the input line 12 varies. Thus, when the fuel pressure from the fuel pump is relatively high, the fuel pressure compresses the spring 40 farther and causes the pressure plate 42 to move farther away from the connecting tube 24. In contrast, when the fuel pressure from the fuel pump is relatively low, the spring 40 is compressed less by the fuel pressure and the pressure plate 42 remains closer to the connecting tube 24.

The regulator 10 can also operate in a high pressure mode. In the high pressure mode, electric current is supplied to the coil 36 through the electrical terminals. The coil 36 then generates a magnetic field that forces the connecting tube 24 and armature 26 assembly to move forward. The casing 34 and armature 26 are preferably made of a ferro-magnetic material, such as iron or steel. The connecting tube 24 and armature 26 assembly move forward until the front surface 44 of the armature 26 abuts against a rear surface 46 of the casing 34.

The forward end of the tube 24 moves the pressure plate 42 forward and compresses the spring 40. As a result, the preload force of the spring 40 is higher in the high pressure mode than in the low pressure mode. Therefore, the high pressure fuel from the fuel pump moves the pressure plate 42 a smaller distance from the connecting tube 24 than the pressure plate 42 is moved in the low pressure mode. Thus, fuel pressure in the output line 14 is higher than in the low pressure mode.

The regulator 10 can be used in different configurations. For example, in the embodiment described above, the maximum gap between the front surface 44 of the armature 26 and the rear surface 46 of the casing 34 (as shown in the FIGS. 1 and 2) may be about 1 mm. This configuration results in about a 5 psi change in pressure in the output line 14 between the low pressure mode and the high pressure mode. However, other gap sizes can be used and other pressure ranges may be achieved.

Figure 3:
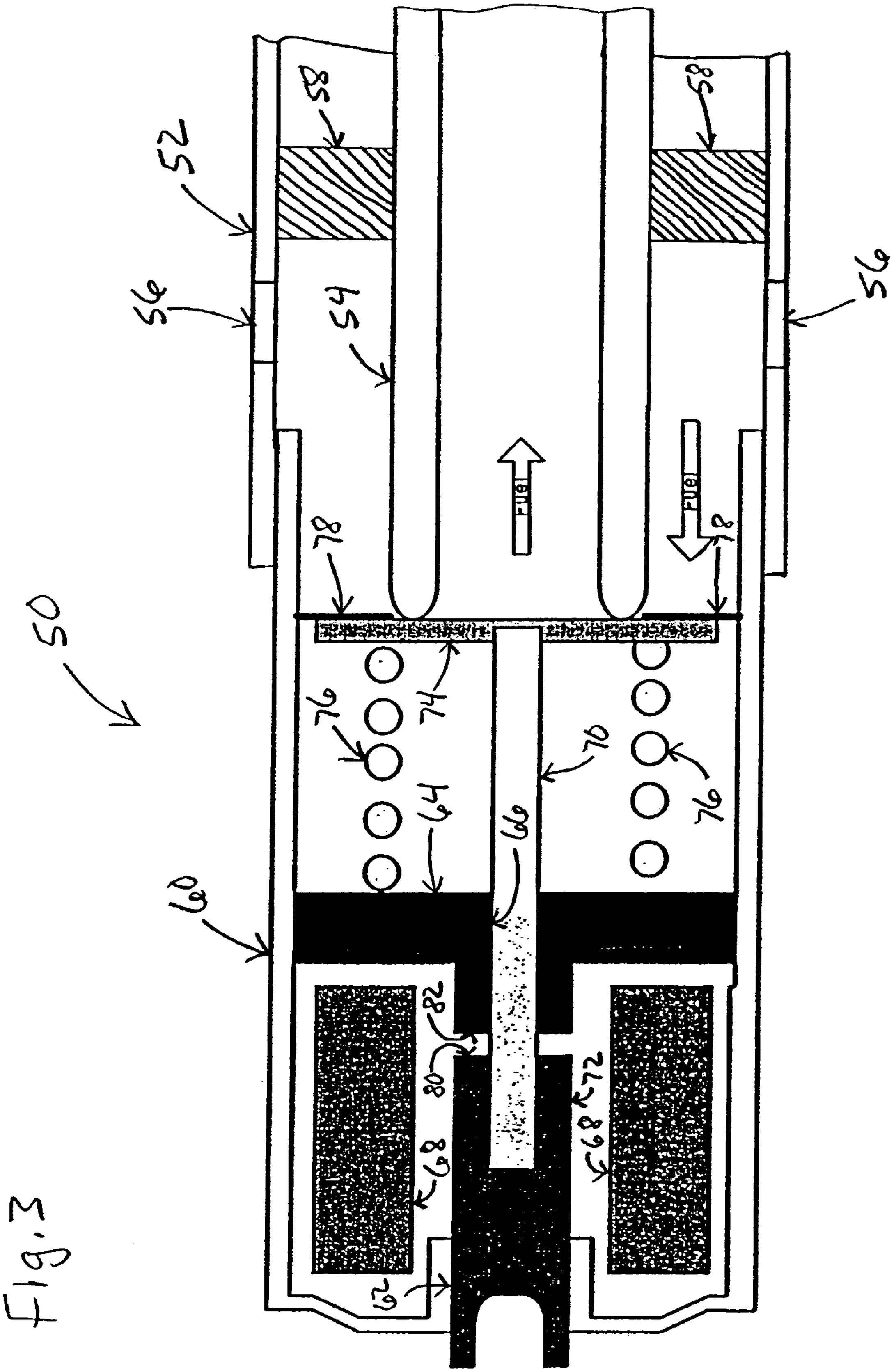
FIG. 3 is a cross-section view of a second embodiment of the fuel pressure regulator.

FIG. 3 shows a second embodiment of a fuel pressure regulator 50. Since the components and operation of the first embodiment of the regulator 10 have been described in detail, descriptions of similar components and operating principles of the second and following embodiments need not be repeated. In the second embodiment, the fuel pump supplies the high pressure fuel through the input line 52. The fuel enters the input line 52 through a hole 56 in the circumference of the input line 52. The output line 54 is positioned coaxially within the input line 52, and supports 58 are installed within the input line 52 to position the output line 54. The input line 52 is fixedly attached to the housing 60 of the regulator 50.

The housing 60 includes a first guide diameter 62 along the front side of the housing 60. A head pole 64 is fixedly attached to the inside of the housing 60. The head pole 64 includes a second guide diameter 66. A coil 68 is then installed inside the housing 60 between the front wall of the housing 60 and the head pole 64. The coil 68 extends around the head pole 64. Electrical terminals (not shown) are provided for supplying the coil 68 with electric current.

A connecting shaft 70 is fixedly attached at one end to an armature 72 and is fixedly attached at the other end to a pressure plate 74. Thus, the armature 72 and shaft 70 assembly can slide forward and rearward through the first 62 and second 66 guide diameters. A spring 76 is positioned within the housing 60 between the head pole 64 and the pressure plate 74. A seal 78 prevents fuel from entering the interior of the regulator 50. The seal 78 is attached at one side to the housing 60 and is attached at the other side to the pressure plate 74. In alternative embodiments, the seal is attached to the pressure plate 74 and slightly engages the housing 60.

In the low pressure mode, little or no electric current is supplied to the coil 68. The spring 76 forces the pressure plate 74 against the rear end of the output line 54. When the pressure level of the fuel from the fuel pump exceeds the preload force of the spring 76, the pressure plate 74 moves away from the output line 54 and compresses the spring 76. Thus, the fuel pressure in the output line 54 is less than the fuel pressure in the input line 52 and is generally constant as previously described.

In the high pressure mode, electric current is supplied to the coil 68. As a result, the rear surface 80 of the armature 72 is attracted towards the front surface 82 of the head pole 64. Therefore, the armature 72 resists movement away from the head pole 64.

Accordingly, the high pressure fuel from the fuel pump overcomes both the preload force of the spring 76 and the resistance of the armature 72. Thus, an increased fuel pressure results in the output line 54 in the high pressure mode compared to the low pressure mode.

One advantage of the second embodiment is that multiple modes are possible for providing a greater range of fuel pressures in the output line 54. This can be achieved by varying the amount of electric current supplied to the coil 68, thereby increasing or decreasing the resistance of the armature 72 to forward movement. Thus, a relationship between the amount of electric current supplied to the coil 68 and the resulting pressure in the output line 54 can be determined and used to control fuel pressure.

Another advantage is that the amount of electric current and the size of the coil 68 may be reduced compared to the first embodiment. The attraction between the front surface 82 of the head pole 64 and the rear surface 80 of the armature 72 becomes considerably higher when these surfaces 80, 82 are positioned relatively close to each other. In contrast to the first embodiment shown in FIGS. 1 and 2, the gap between the front surface 82 of the head pole 64 and the rear surface 80 of the armature 72 may be as small as 0.1 mm. Thus, with the two surfaces 80, 82 being positioned relatively close to each other, a smaller amount of electric current is supplied to the coil 68 to achieve the desired resistance to movement of the pressure plate 74. The size of the coil 68 may alternatively be reduced.

Another advantage of the second embodiment is the ease of assembly. Although the regulator 50 may be assembled in a variety of ways, one possible assembly procedure is as follows. First, the pressure plate 74 is fixedly attached to the connecting shaft 70, and the shaft 70 is installed through the spring 76 and the second guide diameter 66 in the head pole 64. The armature 72 is then installed onto the shaft 70. Second, a calibrated force is applied to the pressure plate 74 and against the spring 76 while the armature 72 is secured in place. Once the spring 76 is compressed, the armature 72 is fixedly attached to the shaft 70. Third, the coil 68 and electrical terminals are installed over the armature 72, and the assembly is installed into the housing 60. The head pole 64 is then fixedly attached to the housing 60. Fourth, the housing 60 is installed onto the input line 52 and the output line 54. Another calibrated force is then applied to the housing 60 to force the output line 54 against the pressure plate 74. This calibrated force is larger than the first calibrated force, and therefore, causes the spring 76 to compress slightly. As a result, the rear surface 80 of the armature 72 moves a small distance away from the front surface 82 of the head pole 64. The housing 60 is then fixedly attached to the input line 52.

Figure 4:
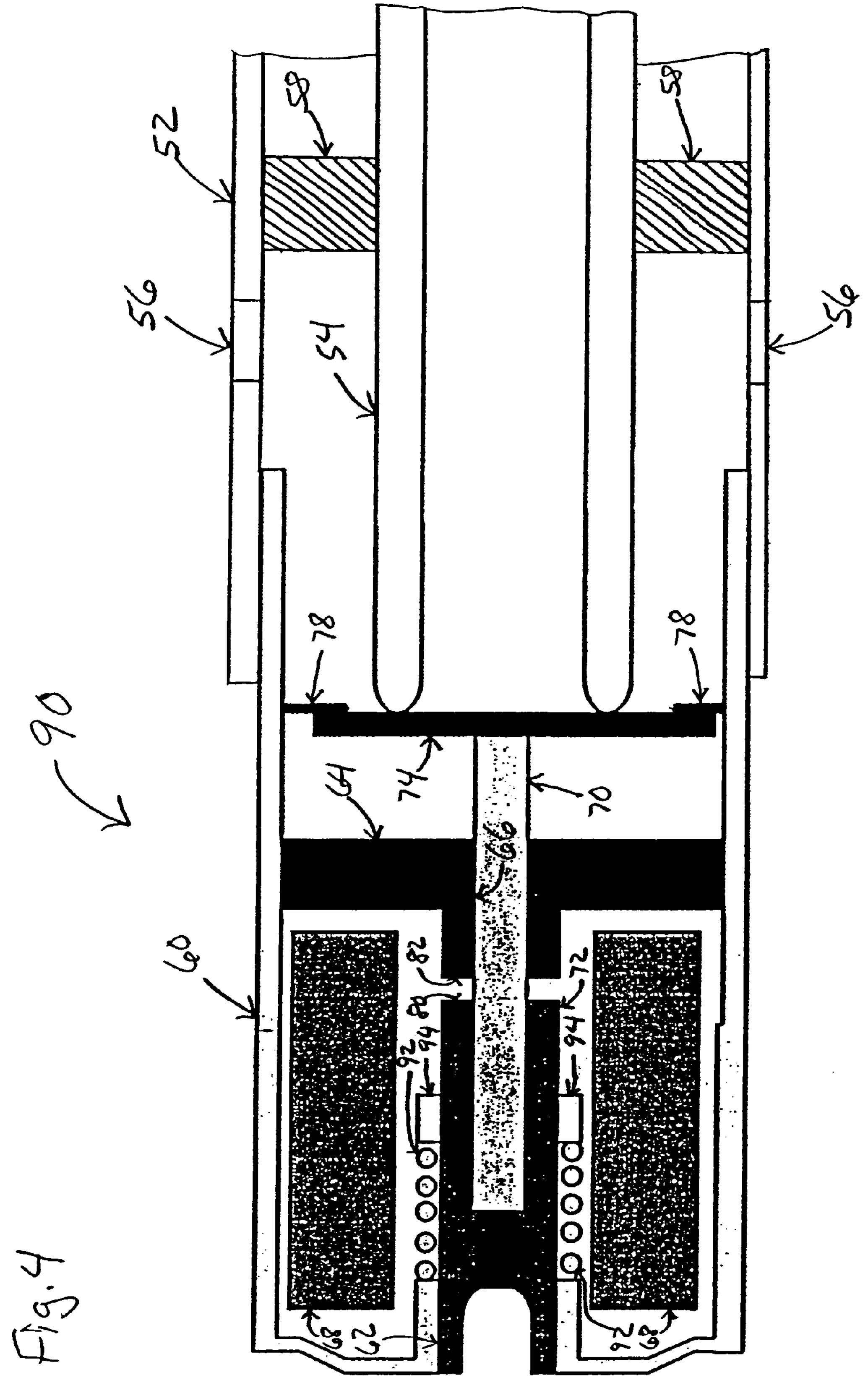
FIG. 4 is a cross-section view of a third embodiment of the fuel pressure regulator.

FIG. 4 shows a third embodiment of the fuel pressure regulator 90. The components and operation of the third embodiment are similar to the second embodiment shown in FIG. 3. However, in this embodiment, a smaller spring 92 is provided, and the location of the spring 92 is changed. The advantage of this embodiment is that the size of the regulator 90 can be further reduced.

Accordingly, the spring 92 is now positioned along the outer surface of the armature 72. One end of the spring 92 abuts against a rear surface of the housing 60, and the other end abuts against a stop 94. The stop 94 is fixedly attached to the armature 72.

The operating principles of the third embodiment are the same as the second embodiment. Thus, in the low pressure mode, little or no electric current is supplied to the coil 68. The high pressure fuel in the input line 52 then forces the pressure plate 74 away from the output line 54, thereby compressing the spring 76. In the high pressure mode (or one of the multi-modes), electric current is supplied to the coil 68. The fuel in the input line 52 overcomes both the preload force in the spring 92 and the resistance of the armature 72.

Figure 5:
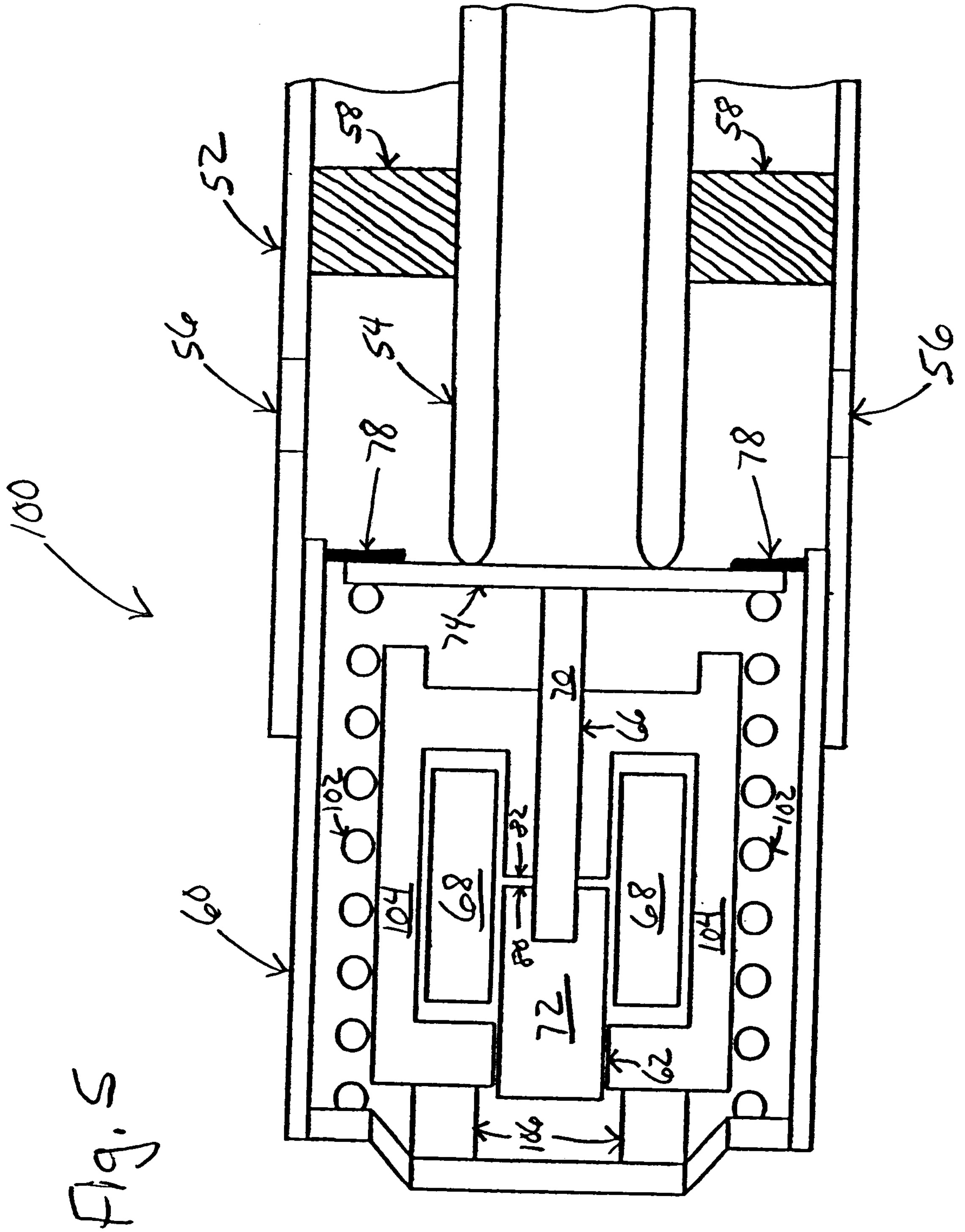
FIG. 5 is a cross-section view of a fourth embodiment of the fuel pressure regulator.

FIG. 5 shows a fourth embodiment of the fuel pressure regulator 100. The fourth embodiment is similar to the second and third embodiments. In this embodiment, a spring 102 is installed along the outer surface of a casing 104. One end of the spring 102 abuts against a rear surface of the housing 60, and the other end abuts against the front surface of the pressure plate 74. The casing 104 is fixedly attached to the housing 60 through a support 106 at the front of the casing 104. The fourth embodiment operates like the second and third embodiments described above.

Figure 6C:
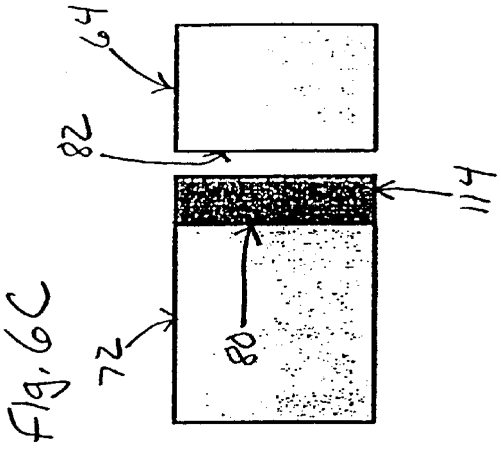
FIGS. 6A–6C are cross-section views of a portion of one embodiment of a fuel pressure regulator, showing three different stops that may be used between the casing, armature or head pole.
Figure 6A:
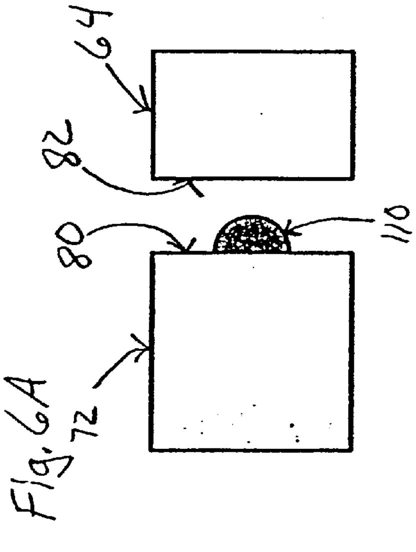
Figure 6B:
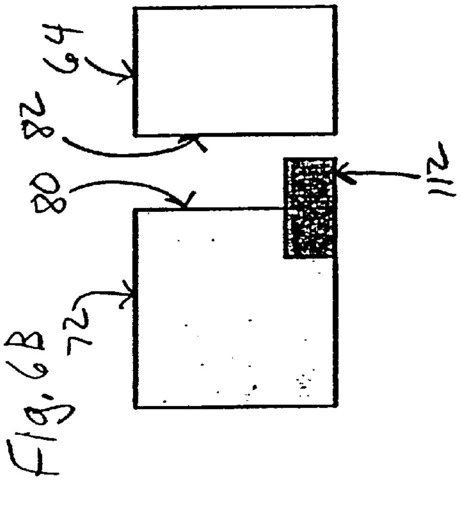

As shown in FIGS. 6A–6C, several types of stops 110, 112, 114 can be used in the gap between the armature 26, 72 and the casing 34,104 or head pole 64. The stops 110, 112, 114 may be used in any of the embodiments described above. The stops 110, 112, 114 are useful in the first embodiment of FIGS. 1 and 2 to prevent the armature 26 from completely abutting against the casing 34, which could result in magnetic remanence. The stops 110, 112, 114 are also useful in the second, third and fourth embodiments to precisely maintain a small gap distance between the armature 72 and the head pole 64 or casing 104. In FIG. 6A, a dimple 110 is shown attached to either the armature 26, 72, casing 34, 104 or head pole 64. Typically, three or more dimples 110 may be used around the circumference of the gap. The dimples 110, like the stops 112, 114 described below, are preferably made from a nonmagnetic material. One type of material that may be used for the dimples 110 is stainless steel.

In FIG. 6B, a ring 112 is shown attached to either the armature 26, 72, casing 34, 104 or head pole 64. The ring 112 may be either segmented or continuous around the circumference of the gap.

In FIG. 6C, a laminated, deposited, or bonded surface 114 is shown within the gap. The laminated surface 114 extends around the circumference of the gap. One type of material that may be used for the laminated surface 114 is bronze.

Figure 7:
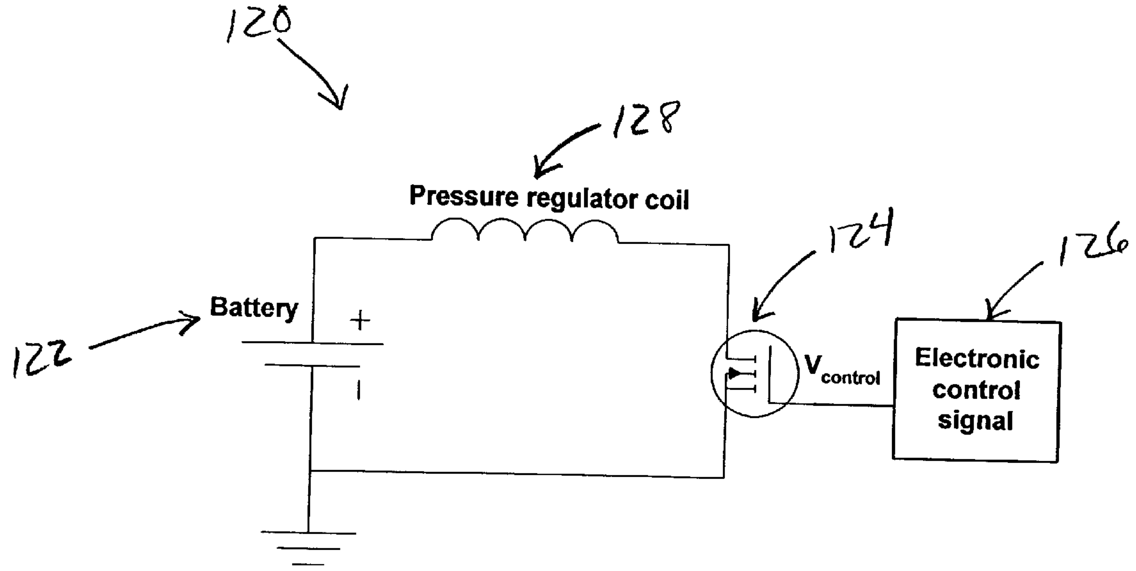
FIG. 7 is a schematic view of an electronic control circuit.

FIG. 7 shows an electronic control circuit that may be used with any of the embodiments of the fuel pressure regulator described above. The control circuit 120 connects the coil 128 of the fuel pressure regulator to a electric power source, such as a battery 122, and to a switching device 124. In the described control circuit 120, the battery 122 and the switching device 124 are connected in series. The switching device 124 may be an electrical transistor, such as a MOSFET, or another type of switching device. The switching device 124 is then controlled by a control signal 126 from a low power electronic control system, such as the electronic fuel delivery control system or engine control system commonly used in conventional automotive systems.

It is now apparent that all of the embodiments of the fuel pressure regulator 10, 50, 90, 100 provide several advantages over conventional pressure regulators and alternative fuel pressure systems. Compared to conventional pressure regulators, the fuel pressure regulator 10, 50, 90, 100 improves automotive vehicle performance by providing more than one fuel pressure to the fuel system. The desired fuel pressure may be readily changed by changing the amount of electric current supplied to the coil 36, 68. Compared to alternative fuel pressure systems, the fuel pressure regulator 10, 50, 90, 100 is less expensive, smaller and easier to assemble. Thus, whereas alternative fuel pressure systems typically include an expensive pressure sensor and a brushless DC motor with speed control circuitry, the fuel pressure regulator described herein requires none of these additional components. Instead, the fuel pressure regulator operates similar to conventional pressure regulators but with the added advantage of being able to provide multi-mode fuel pressure.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. A fuel pressure regulator comprising an input line; an output line; a pressure plate disposed adjacent said output line in a position to restrict flow from said input line to said output line, said pressure plate being moveable away from said output line thereby allowing fuel to pass from said input line to said output line; an electrical coil; a moveable armature disposed within said coil, said armature applying a force to said pressure plate thereby resisting said pressure plate movement away from said output line when electric current is supplied to said coil; and a spring resisting said pressure plate movement away from said output line, wherein said spring is a compression spring contacting one side of said pressure plate, and wherein said spring is disposed on an opposite side of said pressure plate from said coil and said armature.

2. The fuel pressure regulator according to claim 1, further comprising a casing or head pole disposed between said armature and said pressure plate, said coil attracting said armature toward said casing or head pole when supplied with said electric current.

3. The fuel pressure regulator according to claim 1, wherein said coil attracts said armature to a surface when supplied with said electric current thereby applying a force to said pressure plate.

4. A fuel pressure regulator comprising an input line; an output line; a pressure plate disposed adjacent said output line in a position to restrict flow from said input line to said output line, said pressure plate being moveable away from said output line thereby allowing fuel to pass from said input line to said output line; an electrical coil; a moveable armature disposed within said coil, said armature applying a force to said pressure plate thereby resisting said pressure plate movement away from said output line when electric current is supplied to said coil; and a connecting tube attached at one end to said armature and abutting said pressure plate at another end.

5. The fuel pressure regulator according to claim 4, further comprising a housing with an axial hole, said axial hole disposed adjacent said connecting tube and disposed within said output line.

6. The fuel pressure regulator according to claim 4, further comprising a seal attached to said connecting tube.

7. The fuel pressure regulator according to claim 4, further comprising a seal connected to said pressure plate sealing said input line from one side of said pressure plate.

8. The fuel pressure regulator according to claim 1, in combination with an electronic control system comprising an electric power supply connected with said coil, a switching device connected with said coil, and a signal controlling said switching device.

9. The fuel pressure regulator according to claim 4, further comprising a casing or head pole disposed between said armature and said pressure plate, said coil attracting said armature toward said casing or head pole when supplied with said electric current.

10. The fuel pressure regulator according to claim 4, wherein said coil attracts said armature to a surface when supplied with said electric current thereby applying a force to said pressure plate.

11. The fuel pressure regulator according to claim 4, in combination with an electronic control system comprising an electric power supply connected with said coil, a switching device connected with said coil, and a signal controlling said switching device.

12. A fuel pressure regulator comprising an input line; an output line; a pressure plate disposed adjacent said output line in a position to restrict flow from said input line to said output line, said pressure plate being moveable away from said output line thereby allowing fuel to pass from said input line to said output line; an electrical coil; a moveable armature disposed within said coil, said armature applying force to said pressure plate thereby resisting said pressure plate movement away from said output line when electric current is supplied to said coil; a spring positioned to resist said pressure plate movement away from said output line; a casing or head pole disposed between said armature and said pressure plate; wherein said coil attracts said armature to a surface of said casing or head pole when supplied with said electric current thereby applying a force to said pressure plate; and a connecting tube attached at one end to said armature and abutting said pressure plate at another end.

13. The fuel pressure regulator according to claim 12, wherein said spring is a compression spring contacting one side of said pressure plate; and further comprising a housing with an axial hole, said axial hole disposed adjacent said connecting tube and disposed within said output line.

14. The fuel pressure regulator according to claim 13, further comprising a seal attached to said connecting tube; further comprising a seal connected to said pressure plate sealing said input line from one side of said pressure plate; and further comprising a stop made of nonmagnetic material disposed between said armature and said casing or head pole.

15. The fuel pressure regulator according to claim 12, in combination with an electronic control system comprising an electric power supply connected with said coil, a switching device connected with said coil, and a signal controlling said switching device.

* * * * *

UNITED STATES PATENT AND TRADEMARK OFFICE

CERTIFICATE OF CORRECTION

PATENT NO. : 6,626,150 B2 
DATED : September 30, 2003
INVENTOR(S) : Rodolfo Palma It is certified that error appears in the above-identified patent and that said Letters Patent is hereby corrected as shown below:

Column 8,
Line 31, after "armature applying" insert -- a --.

Signed and Sealed this

Tenth Day of August, 2004

JON W. DUDAS
*Acting Director of the United States Patent and Trademark Office*